US006804759B2

(12) United States Patent
Luick

(10) Patent No.: US 6,804,759 B2
(45) Date of Patent: Oct. 12, 2004

(54) METHOD AND APPARATUS FOR DETECTING PIPELINE ADDRESS CONFLICT USING COMPARE OF BYTE ADDRESSES

(75) Inventor: David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 10/098,777

(22) Filed: Mar. 14, 2002

(65) Prior Publication Data

US 2003/0177326 A1 Sep. 18, 2003

(51) Int. Cl.[7] .............................................. G06F 12/00
(52) U.S. Cl. ...................... 711/169; 711/150; 711/151; 711/167; 711/210; 709/102; 709/107; 712/206; 712/215; 712/216; 712/219; 712/246
(58) Field of Search ................................. 709/102, 107; 711/150, 151, 167, 169, 210; 712/206, 215, 216, 219, 246

(56) References Cited

U.S. PATENT DOCUMENTS

| | | | |
|---|---|---|---|
| 5,293,595 A | * 3/1994 | Caldarale et al. | 711/210 |
| 5,854,914 A | * 12/1998 | Bodas et al. | 712/216 |
| 5,987,593 A | * 11/1999 | Senter et al. | 712/206 |
| 6,463,514 B1 | 10/2002 | Ray et al. | |

* cited by examiner

Primary Examiner—Donald Sparks
Assistant Examiner—Bao Q. Truong
(74) Attorney, Agent, or Firm—Roy W. Truelson

(57) ABSTRACT

In a computer processor, a low-order portion of a virtual address for a pipelined operation is compared directly with the corresponding low-order portions of addresses of operations below it in the pipeline to detect an address conflict, without first translating the address. Preferably, if a match is found, it is assumed that an address conflict exists, and the pipeline is stalled one or more cycles to maintain data integrity in the event of an actual address conflict. Preferably, the CPU has caches which are addressed using real addresses, and a translation lookaside buffer (TLB) for determining the high-order portion of a real address. The comparison of low-order address portions provides conflict detection before the TLB can translate a real address of an instruction.

25 Claims, 8 Drawing Sheets

METHOD AND APPARATUS FOR DETECTING PIPELINE ADDRESS CONFLICT USING COMPARE OF BYTE ADDRESSES

CROSS-REFERENCE TO RELATED APPLICATION

Ser. No. 10/098,002 to David A. Luick, entitled "Method and Apparatus for Detecting Pipeline Address Conflict Using Parallel Compares of Multiple Real Addresses".

FIELD OF THE INVENTION

The present invention relates generally to digital data processing, and more particularly to pipelined operations in a processing unit of a data processing system.

BACKGROUND OF THE INVENTION

A modern computer system typically comprises a central processing unit (CPU) and supporting hardware necessary to store, retrieve and transfer information, such as communications busses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the "throughput") may be crudely measured as the number of operations performed per unit of time. Conceptually, the simplest of all possible improvements to system speed is to increase the clock speeds of the various components, and particularly the clock speed of the processor. E.g., if everything runs twice as fast but otherwise works in exactly the same manner, the system will perform a given task in half the time. Early computer processors, which were constructed from many discrete components, were susceptible to significant speed improvements by shrinking component size, reducing component number, and eventually, packaging the entire processor as an integrated circuit on a single chip. The reduced size made it possible to increase the clock speed of the processor, and accordingly increase system speed.

Despite the enormous improvement in speed obtained from integrated circuitry, the demand for ever faster computer systems has continued. Hardware designers have been able to obtain still further improvements in speed by greater integration (i.e., increasing the number of circuits packed onto a single chip), by further reducing the size of the circuits, and by various other techniques. However, designers can see that physical size reductions can not continue indefinitely, and there are limits to their ability to continue to increase clock speeds of processors. Attention has therefore been directed to other approaches for further improvements in overall speed of the computer system.

Without changing the clock speed, it is possible to improve system throughput by using multiple copies of certain components, and in particular, by using multiple CPUs. The modest cost of individual processors packaged on integrated circuit chips has made this practical. While there are certainly potential benefits to using multiple processors, additional architectural issues are introduced. Without delving deeply into these, it can still be observed that there are many reasons to improve the speed of the individual CPU, whether or not a system uses multiple CPUs or a single CPU. If the CPU clock speed is given, it is possible to further increase the speed of the individual CPU, i.e., the number of operations executed per second, by increasing the average number of operations executed per clock cycle.

Most modern processors employ some form of pipelining to increase the average number of operations executed per clock cycle, as well as one or more levels of cache memory to provide high-speed access to a subset of data in main memory. Pipelined instruction execution allows subsequent instructions to begin execution before previously issued instructions have finished. Ideally, a new instruction begins with each clock cycle, and subsequently moves through a pipeline stage with each cycle. Even though an instruction may take multiple cycles or pipeline stages to complete, if the pipeline is always full, the processor executes one instruction every cycle.

Of course, the pipeline being always full is simply an ideal towards which designers strive, knowing that it is impossible to always keep the pipeline full. For various reasons, the pipeline will sometimes stall. For example, the instruction stream may take an unexpected branch to an instruction which is not in the cache, or may load data from a data location which is not in the immediate (lowest level) cache. In these cases, the processor can not begin a new instruction, and must typically wait until the necessary instruction or data is fetched into the cache, either from another higher level cache, or from main memory.

There are other causes of pipeline stall. Among them are address conflicts between pipeline operations, particularly, between load and store operations. If a store operation stores data to an address X, and a load operation subsequently loads data from address X, care must be taken that the store operation completes before the load operation begins, or incorrect data may be loaded. In order to prevent erroneous operation, a processor using pipelined instruction execution typically compares the address of a target operand of certain operations with similar addresses of operations in the pipeline. If a conflict is detected, the subsequent operation must be delayed or restarted.

Some system designs, of which UNIX-based systems are an example, employ a form of virtual addressing which has the possibility of address aliasing. I.e., addresses derived from the instructions and generated by the processor, which are often referred to as "virtual addresses" or "effective addresses", are mapped to addresses in the physical main memory of the system, generally referred to as "real addresses" or "physical addresses", where it is possible that multiple virtual addresses map to the same real address. Because multiple virtual addresses may map to the same real address, the cache is typically accessed with a real address and only the real address may reliably be used to determine whether there is an address conflict in pipeline operations.

Typically, in order to obtain a real address of data for a data reference operation (e.g., a load or store operation), a portion of the virtual address is used to access a table called a translation lookaside buffer (TLB). The TLB is typically N-way set associative, providing N possible real address entries corresponding to the virtual address. A TLB lookup requires that the N entries be retrieved from the TLB, that each entry be compared to the virtual address, and that the real address corresponding to the matched entry be selected. These operations may require multiple clock cycles.

Where an address conflict exists between pipeline operations, it is desirable to detect the conflict as soon as possible. The longer it takes to detect such a conflict, the greater is the potential performance impact. Not only is the conflicting instruction potentially compromised, but instructions occurring after the conflicting instruction may be compromised as well. Late detection of an address conflict requires that all potential data integrity exposures be rectified before proceeding. Since an address conflict can not be detected until the virtual addresses are translated to real addresses, the time required to perform the TLB lookup directly delays the detection of an address conflict.

As processors grow more capable and more complex, the problem of address conflicts between pipeline operations will be magnified. Some newer processor designs employ so-called "Wide Issue Superscalar" or "Very Long Instruction Word" (VLIW) architectures, in which multiple operations are concurrently executed, and multiple loads and stores can be issued concurrently. Other processor designs also grow in complexity, as the lengths of pipelines increase, multiple pipelines may exist, multiple levels of cache may be supported, etc.

All of this growing complexity increases the number of active pipeline stages at any instant in time, which has two consequences. On the one hand, there is an increased likelihood of an address conflict, while at the same time, there is a greater potential performance impact of restarting the pipelines when an address conflict exists. Thus, address conflicts may become a significant performance bottleneck as pipeline complexity increases in current and future processor designs. Although this trend is not necessarily well understood, there exists a need now and in the future for improved techniques for dealing with pipeline address conflicts.

SUMMARY OF THE INVENTION

A low-order portion of a virtual address ("byte address") for a pipelined operation is compared directly with the corresponding low-order portions of addresses of one or more other operations in the pipeline mechanism to detect an address conflict, without translating the address through an address translation mechanism. If no match of byte addresses is detected, then there is no address conflict and pipeline operations proceed normally.

In the preferred embodiment, if a match is found between byte addresses, it is assumed that an address conflict does exist, and no further verification of an actual address conflict is performed. In this case, the corresponding operations are treated as if an actual address conflict exists, even though the higher-order portions of the addresses may not match. Specifically, if the operations are of a type which require some minimum time interval between them or require that one operation complete before the later operation can begin (e.g., a store operation, followed by a load operation), the later operation (and any beginning after it in the pipeline) are stalled a sufficient time to prevent any data integrity exposure. This may be accomplished by stalling a pre-determined number of cycles, by stalling until the earlier conflicting operation completes, or other means. It is alternatively possible to restart the pipeline.

In the preferred embodiment, the CPU has one or more caches, which are addressed using real addresses. An N-way translation lookaside buffer (TLB) in the CPU is used to determine the high-order portion of a real address from the high-order portion of a virtual address. Pipeline stages contain the corresponding real addresses of the operations once the real addresses have been determined. The low-order portion of a new pipeline operation is compared with the low-order address portions of potentially conflicting operations ahead of it in the pipeline, without first translating the virtual address of the new pipeline operation through the TLB.

A pipeline address conflict detection mechanism in accordance with the preferred embodiment of the present invention has several advantages. Pipeline address conflicts are detected at an earlier stage, and as a result, the performance impact of an individual conflict is reduced. Generally, as a result of early detection, data integrity can be preserved by simply stalling the later instruction in the pipeline, rather than restarting the pipeline after the instruction has proceeded well down the pipe. Even though a certain number of "false positives" will be detected, the reduced performance cost of each detected address conflict will typically more than offset the false positives. Stalling a portion of the pipeline is generally simpler and generally requires less hardware than that required for restarting the pipeline after some progress has already been made. Finally, the hardware required to make the address comparisons for purposes of detecting an address conflict is reduced, because only a subset of the entire address need be compared.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1A:
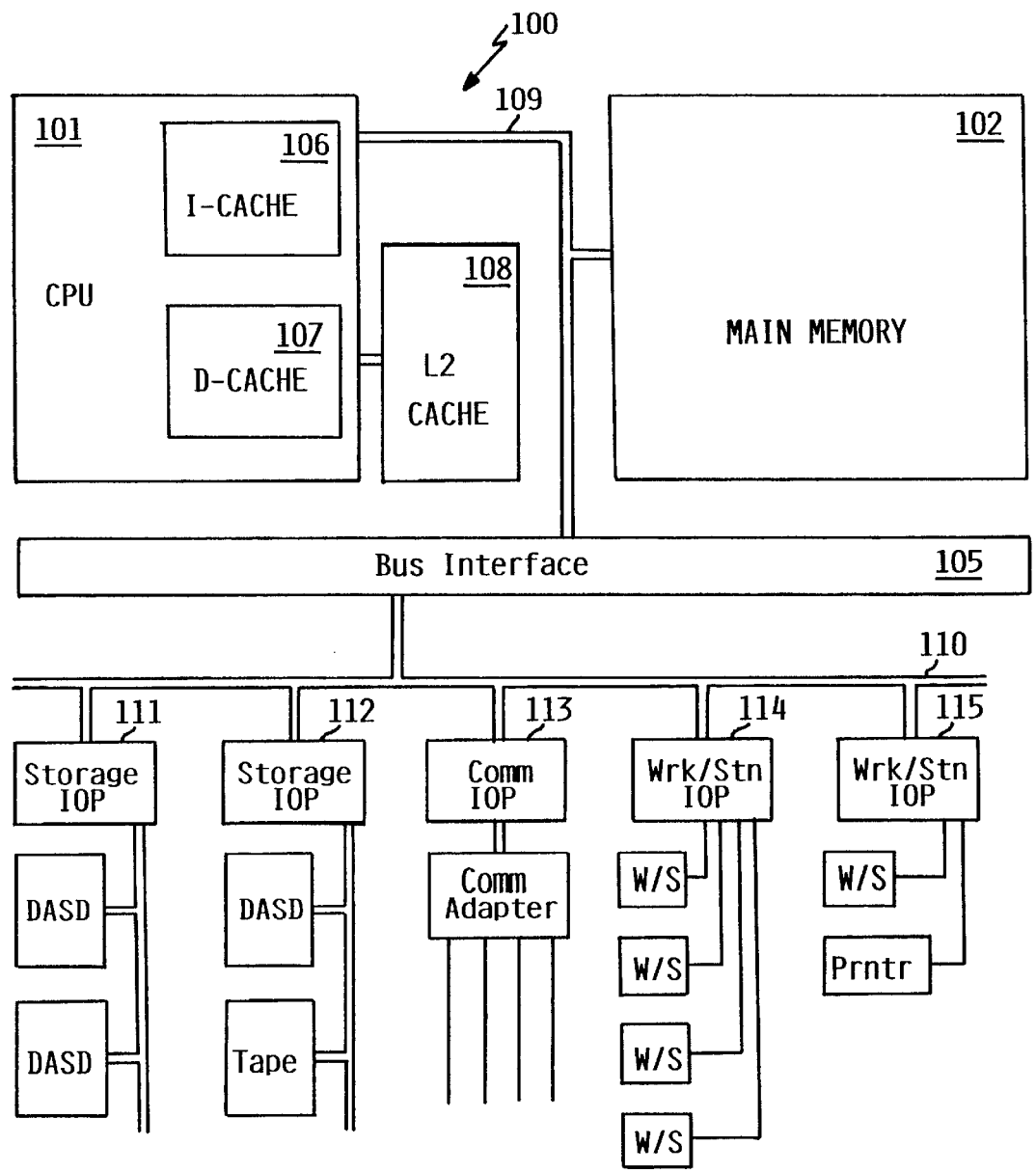
FIG. 1A is a high-level block diagram of the major hardware components of a single-CPU computer system for utilizing a pipeline address conflict mechanism, according to the preferred embodiment of the present invention.

Referring to the Drawing, wherein like numbers denote like parts throughout the several views, FIG. 1A is a high-level representation of the major hardware components of a single-CPU computer system 100 for utilizing a pipeline address conflict detection and resolution mechanism, according to the preferred embodiment of the present invention. CPU 101 processes instructions and data from main memory 102. CPU 101 temporarily holds instructions and data in a cache structure for more rapid access. In the embodiment of FIG. 1A, the cache structure is shown as separate internal level one instruction cache 106 (L1 I-cache) and level one data cache 107 (L1 D-cache), and level two cache 108 (L2 cache) closely coupled to CPU 101. However, it should be understood that the cache structure may be different; that the number of levels and division of function in the cache may vary; and that a system might in fact have no cache at all. L1 I-cache 106 stores instructions for execution by CPU 101. L1 D-cache stores data (other than instructions) to be processed by CPU 101. L2 cache can be used to hold both instructions and data. Memory bus 109 provides a data communication path for transferring data among CPU 101, main memory 102 and I/O bus interface 105, which is further coupled to system I/O bus 110 for transferring data to and from various I/O units. I/O processing units (IOPs) 111–115 attach to system I/O bus 110 and support communication with a variety of storage and other I/O devices, such as direct access storage devices (DASD), tape drives, workstations, printers and remote communications lines for communicating with remote devices or with other computer systems.

Figure 1B:
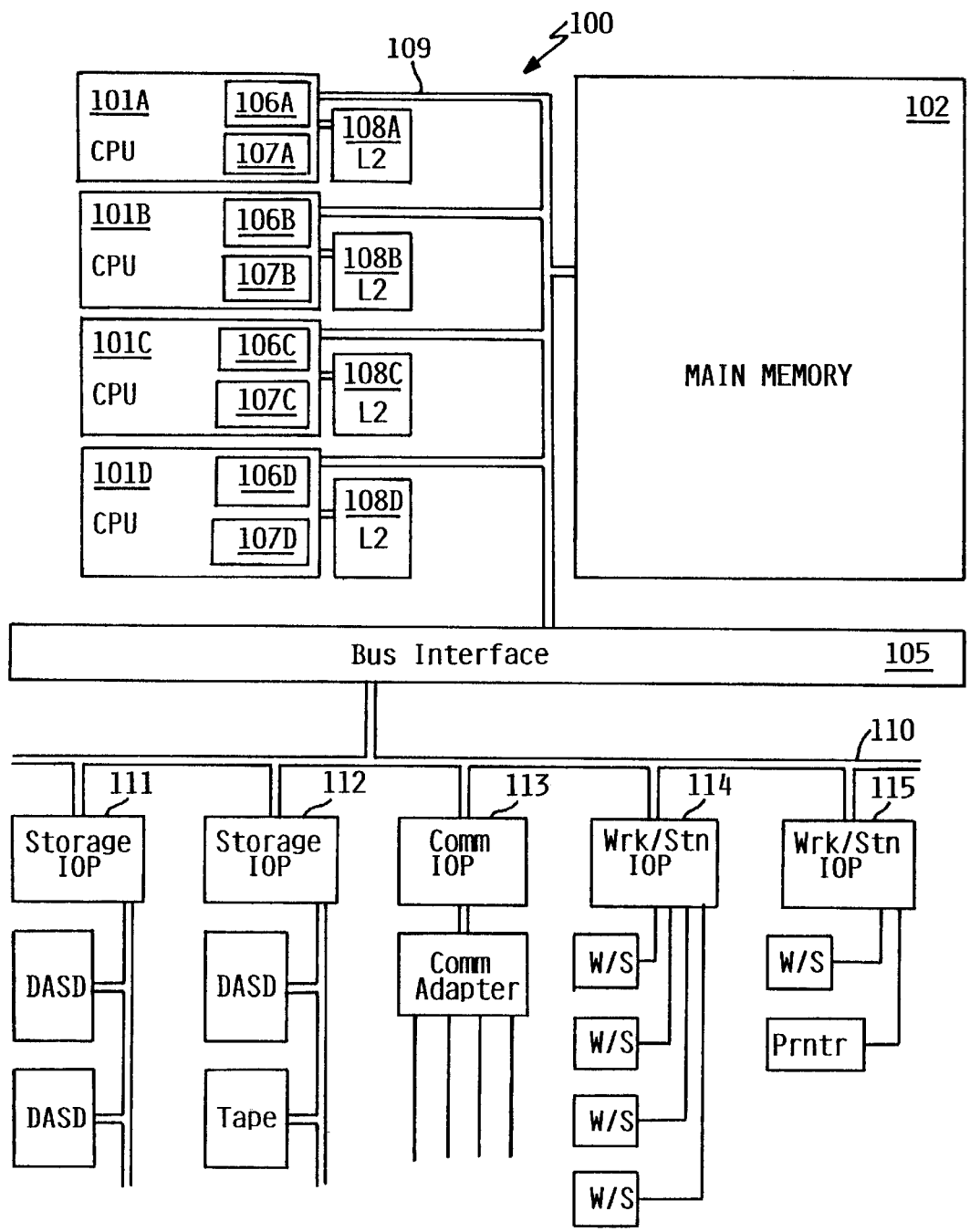
FIG. 1B is a high-level block diagram of the major hardware components of a multiple-CPU computer system for utilizing a pipeline address conflict mechanism, according to the preferred embodiment of the present invention.

It should be understood that FIG. 1A is intended to depict the representative major components of system 100 at a high level, that individual components may have greater complexity than represented FIG. 1A, and that the number and types of such components may vary. In particular, system 100 may contain multiple CPUs. Such a multiple CPU system is depicted at a high level in FIG. 1B. FIG. 1B shows a system having four CPUs 101A, 101B, 101C, 101D, each CPU having respective L1 I-cache 106A, 106B, 106C, 106D, and respective L1 D-cache 107A, 107B, 107C, 107D. A separate L2 cache 108A, 108B, 108C, 108D for instructions and data is associated with each CPU. As used herein, CPU and caches are referenced by generic reference numbers as CPU 101, L1 I-cache 106, L1 D-cache 107 and L2 cache 108, it being understood that such devices could be contained either in a single CPU system as shown in FIG. 1A or a multiple CPU system as shown in FIG. 1B.

In FIGS. 1A and 1B, memory bus 109 is shown at a high level as providing a communications path among CPUs, main memory and I/O. It should be understood that this is a high-level representation only, and that in fact memory bus 109 may comprise multiple different buses or communication paths, which may be arranged in a hierarchy. Additionally, main memory 102 may be divided into portions associated with particular CPUs or sets of CPUs and particular buses, as in any of various so-called non-uniform memory access (NUMA) computer system architectures.

While various system components have been described and shown at a high level, it should be understood that a typical computer system contains many other components not shown, which are not essential to an understanding of the present invention. In the preferred embodiment, computer system 100 supports a UNIX-based operating system, although it may support other operating systems either in addition to UNIX or instead of UNIX.

Figure 2:
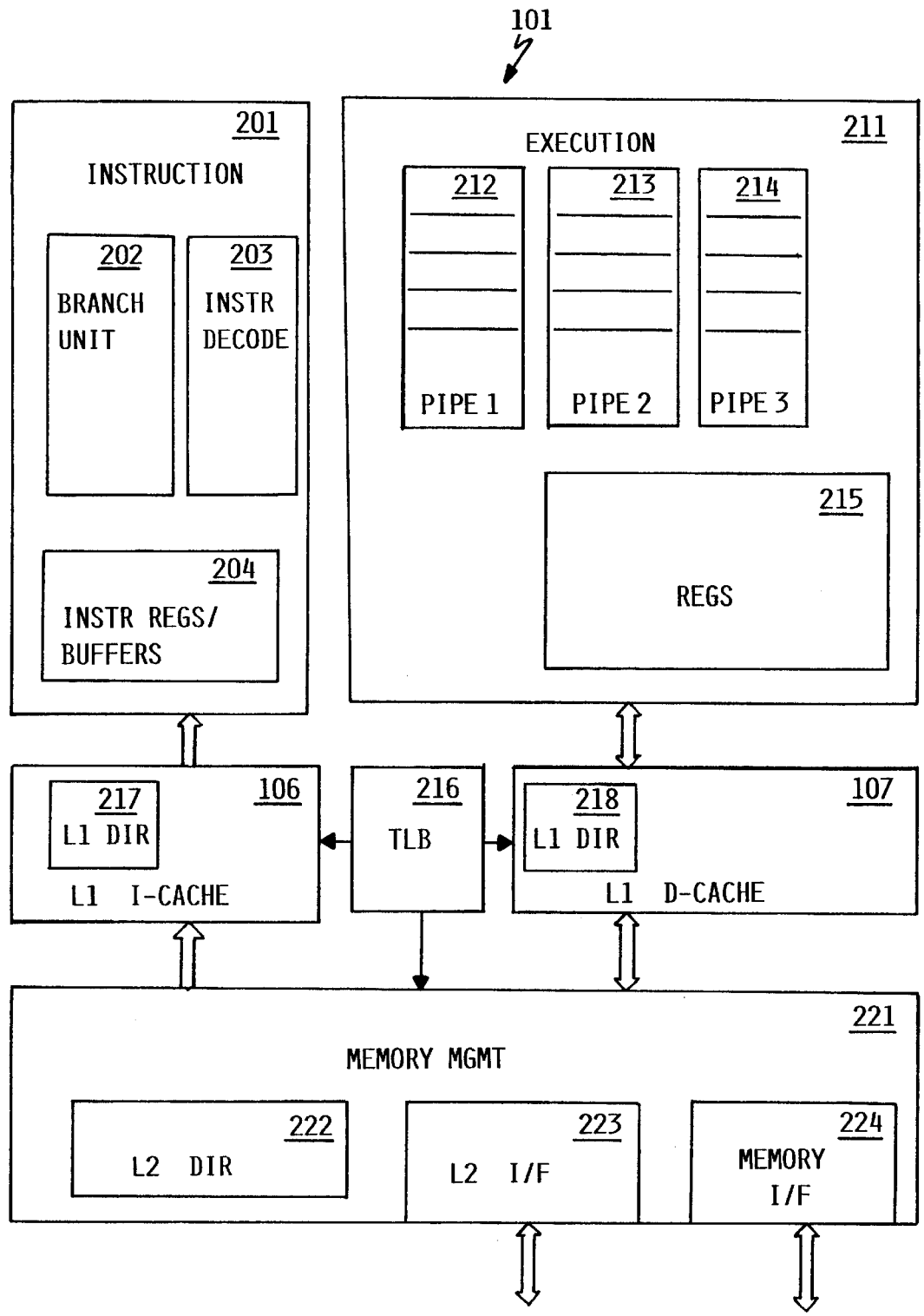
FIG. 2 is a high-level block diagram of the major components of a CPU of a computer system according to the preferred embodiment.

FIG. 2 is a high-level diagram of the major components of CPU 101 according to the preferred embodiment, showing CPU 101 in greater detail than is depicted in FIGS. 1A and 1B. In this embodiment, the components shown in FIG. 2 are packaged in a single semiconductor chip. CPU 101 includes instruction unit portion 201, execution unit portion 211, and memory management portion 221. In general, instruction unit 201 obtains instructions from L1 I-cache 106, decodes instructions to determine operations to perform, and resolves branch conditions to control program flow. Execution unit 211 performs arithmetic and logical operations on data in registers, and loads or stores data. Memory management unit 221 provides data to the L1 caches and interfaces with memory external to the CPU (i.e., in the L2 cache or main memory) where instructions or data must be fetched or stored.

Instruction unit 201 comprises branch unit 202, instruction decode/dispatch unit 203, and instruction registers and buffers 204. Instructions from L1 I-cache 106 are loaded into buffers 204 prior to execution. Depending on the CPU design, there may be multiple buffers (e.g., one for a sequential series of instructions, and others for branch-to locations), each of which may contain multiple instructions. Decode/dispatch unit 203 receives the current instruction to be executed from one of the buffers, and decodes the instruction to determine the operation(s) to be performed or branch conditions. Branch unit 202 controls the program flow by evaluating branch conditions, and refills buffers from L1 I-cache.

Execution unit 211 preferably comprises multiple pipelines 212–214 and a bank of registers 215. Registers 215 store data for input to, output from, and control of operations performed by execution unit 211, and may include general purpose integer registers, floating point registers, and various special purpose registers. Pipelines 212–214 are used to perform various operations which require multiple clock cycles to complete. In the preferred embodiment, at least one of pipelines 212–214 is a load/store pipeline used for transferring data between registers 215 on the one hand and some form of memory (cache or main memory) on the other. Additional pipelines may be used for various arithmetic and logic operations, including floating point operations, or for other operations. While three pipelines are illustrated by way of example in the simplified block diagram of FIG. 2, the actual number of pipelines may vary considerably depending on processor design, and there could be multiple load/store pipelines.

L1 I-cache 106 and L1 D-cache 107 are separate instruction and data caches providing data to instruction and execution units. Typically, data is taken from or stored to these units, and if the data is unavailable in the L1 cache, it is loaded into the L1 cache from L2 cache 108 or main memory 102, and then transferred from L1 cache to the corresponding unit. Depending on the processor design, it may be possible to by-pass L1 cache and load data from L2 cache to an execution or instruction register. L1 I-cache 106 contains a directory 217 of its contents, and L1 D-cache 107 likewise contains a directory 218 of its contents.

Memory management unit 221 includes L2 cache directory 222, L2 cache interface 223, and memory bus interface 224. L2 cache directory 222 is a directory of the contents of L2 cache 108. L2 cache interface 223 handles the transfer of data directly to and from L2 cache 108. Memory bus interface 224 handles the transfer of data across memory bus 109, which may be to main memory or to I/O units via bus interface 105. Memory management unit 221 routes data accesses to the various units. E.g., when the load/store pipeline processes a load command, requiring data to be loaded to a register, memory management unit 221 will fetch data from the L2 cache 108 or main memory 102 as necessary.

Translation lookaside buffer (TLB) 216 is used to translate a virtual address generated by execution of a load/store instruction to a physical address at which data is stored in main memory 102 or cache, as explained more fully herein. A single TLB is shown in FIG. 2. However, depending on the processor design, there could be multiple TLBs. For example, there could be separate TLBs for the L1 I-cache and for the L1 D-cache. There could further be a separate TLB for the L2 cache.

While various CPU components have been described and shown at a high level, it should be understood that the CPU of the preferred embodiment contains many other components not shown, which are not essential to an understanding of the present invention. For example, various additional special purpose registers will be required in a typical design. Furthermore, it will be understood that the CPU of FIG. 2 is simply one example of a CPU architecture, and that many variations could exist in the number, type and arrangement of components within CPU 101, that components not shown may exist in addition to those depicted, and that not all components depicted might be present in a CPU design. For example, the number and configuration of buffers and caches may vary; the number and function of execution unit pipelines may vary; registers may be configured in different arrays and sets; dedicated floating point hardware may or may not be present; etc. Additionally, CPU 101 may have further capability to perform parallel operations, as in any of various so-called "Wide Issue Superscalar" or "Very Long Instruction Word" (VLIW) architectures, in which case the number of pipelines may be quite large, and there will typically be multiple load/store pipelines.

Figure 3:
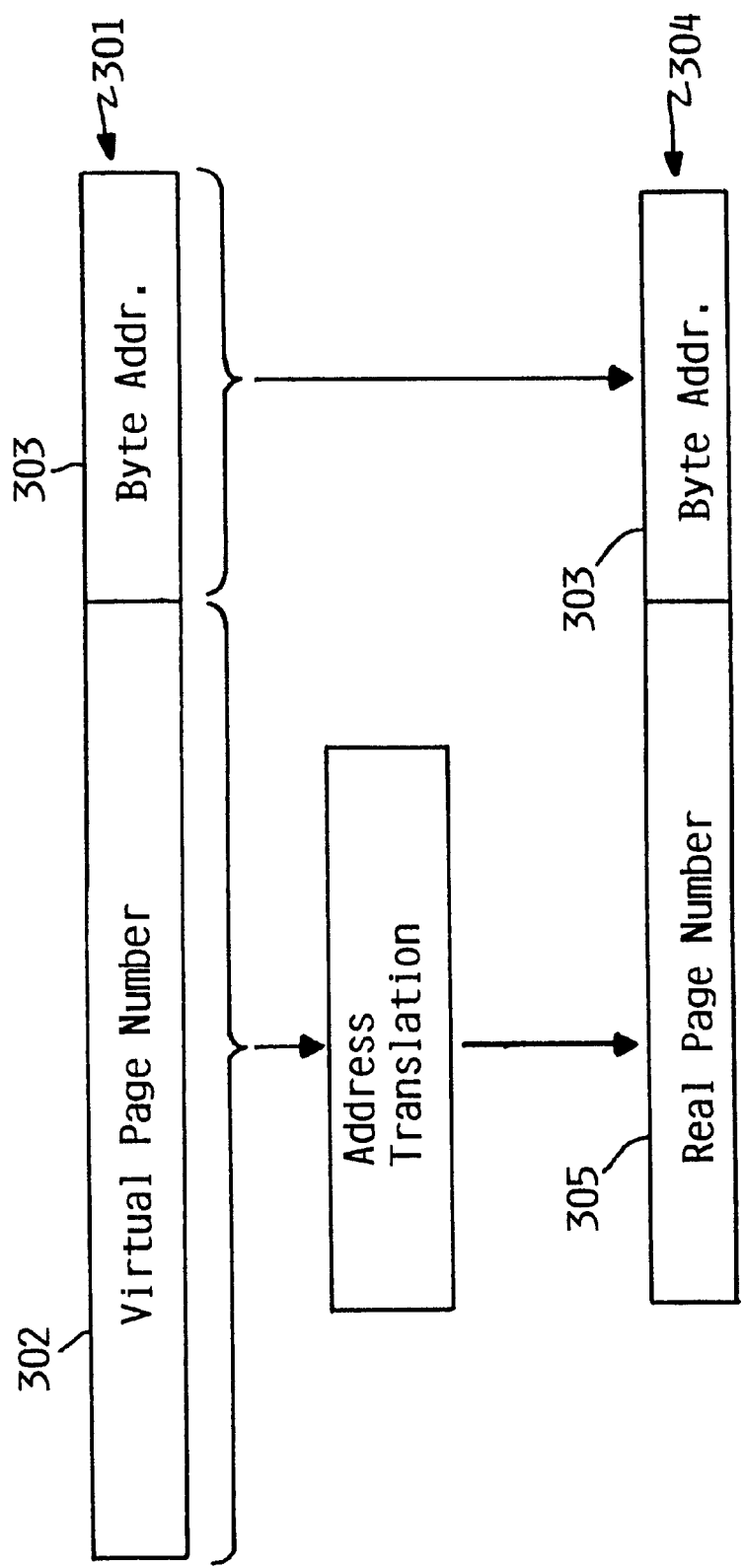
FIG. 3 is a logical illustration of address translation, according to the preferred embodiment.

Computer system 100 of the preferred embodiment utilizes at least two forms of addressing, as illustrated logically in FIG. 3. A "virtual address" 301 refers to the address generated in internal processor operations from instructions and data by instruction unit 201 in conjunction with execution unit 211, whether known as a "virtual address", "effective address", or by some other name. I.e., sequential instruction addresses and branch-to addresses for executable instructions are addresses in the virtual address space. Similarly, addresses for data access operations, such as data loads and stores, derived either directly from instructions, indirectly from register values, or by computation using some combination of data contained in instructions and registers, are addresses in the virtual address space. The virtual address space is the address space from the point of view of the executable code. A virtual address may be produced in any of various ways known in the art, e.g., as a concatenation of some high-order address bits in a special-purpose register (which changes infrequently, e.g., when execution of a new task is initiated) and lower order address bits from an instruction; as a computed offset from an address in a general purpose register; as an offset from the currently executing instruction; etc. A virtual address comprises K+L bits, including a K-bit virtual page number 302 and an L-bit byte address (also known as a byte index or byte number) 303. In the preferred embodiment, K is 52 and L is 12, making a 64-bit virtual address. By convention herein, these bits are numbered 0 to 63 (0 being the highest order bit). A "real address" 304 refers to a physical location in memory 102 where the data is stored, whether known as a "real address", "physical address", or some other name. A real address comprises M+L bits, including an M-bit real page number 305 and an L-bit byte address 303, which is the same as the L-bit byte address portion of the virtual address. In the preferred embodiment, M is 36, making a 48-bit real address. By convention, real address bits are numbered 16 to 63 herein (16 being the highest order bit). It should be understood that the values of K, L and M may vary, although typically K>M.

FIG. 3 illustrates a simplified form of address translation in which two levels of address exist, one corresponding to processor-generated virtual addresses and the other corresponding to real addresses in memory. It will be understood that many computer systems support additional levels of addresses, which for clarity of illustration are not shown in FIG. 3. For example, unique addresses may exist in a large, global address space which is shared by all users and processes in a computer system, and these addresses may correspond to addresses in a second (usually smaller) address space of processor-generated addresses, which may in turn correspond to addresses in a third (still smaller) address space of the physical memory of the system.

As is well known, the size of a virtual address space is typically much larger than physical memory, and data is typically paged in from storage devices (such as rotating magnetic disk drives) as needed, and paged out to storage when no longer needed. Hence, the correspondence between virtual addresses and real addresses constantly changes. Computer system 100 contains address translation mechanisms for translating virtual addresses generated by CPU 101 to real addresses corresponding to locations in memory 102 and caches 106–108. Such address translation mechanisms typically include a page table and associated logic (not shown), which maps virtual page numbers 302 to real page numbers 305. The page table being quite large, it is generally contained in main memory or some other storage external to CPU 101. Additionally, computer system 100 may support an alternative virtual-equals-real addressing mode, in which virtual addresses generated by CPU 101 are the same as real addresses (the highest order bits of virtual address being zero); this addressing mode is generally reserved for certain special operating system instructions and data structures, and not used for ordinary user applications and data.

The caches 106–108 contain selected parts of data in main memory 102. Each cache contains a directory of its contents, enabling CPU logic to determine whether desired data is contained in the cache. In the preferred embodiment, the cache directory contains real addresses of the data stored in the cache, and real addresses are used to access the directory. While it is possible (and some computer systems do) organize a cache directory using virtual addresses, the need to maintain cache coherency where multiple caches exist, and the use of aliasing in some operating systems, favor the use of real addresses. This means that the CPU must determine a real address of data when accessing the cache. Because the page table is external to CPU 101, a rapid address translation mechanism is provided on-board CPU 101 in the form of TLB 216. Although all caches are addressed with real addresses in the preferred embodiment, it is alternatively possible to organize some or all of the caches so that they are addressed with virtual addresses.

Figure 4:
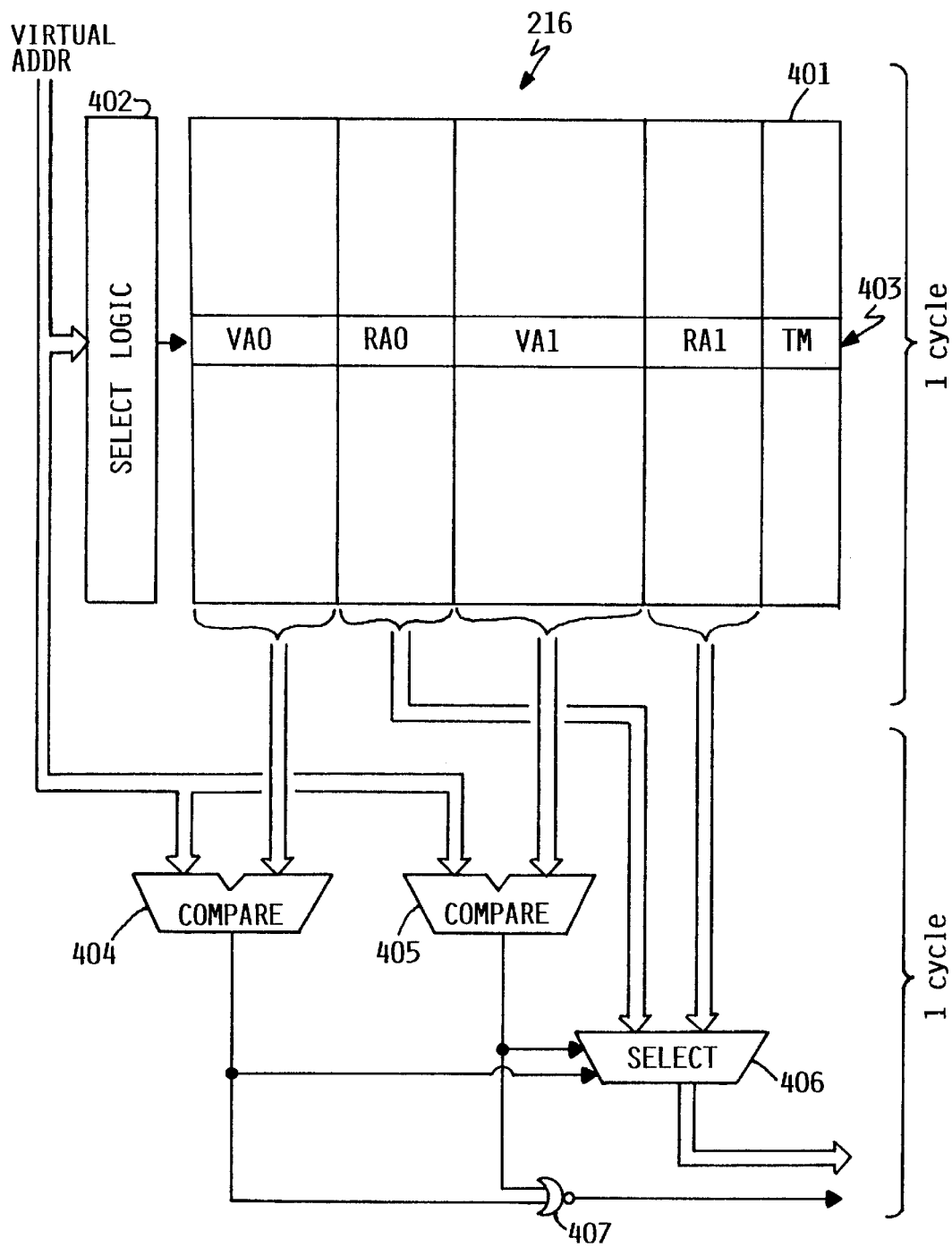
FIG. 4 shows the structure of a translation lookaside buffer (TLB) and its associated logic, according to the preferred embodiment.

FIG. 4 shows the structure of TLB 216 and associated logic, according to the preferred embodiment. TLB 216 is essentially a cache containing selected parts of the page table, enabling CPU 101 to translate addresses of data in its L1 or L2 caches without going to the external page table. As shown in FIG. 4, TLB 216 comprises an N-way associative table 401, where N is typically greater than 1. A line of the table is accessed by decoding some combination of virtual address bits in select logic 402. Each line 403 contains N address entries, along with other data used for table maintenance. Each address entry contains a virtual page number and its corresponding real page number. The TLB of FIG. 4 is a 2-way associative TLB (N=2), it being understood that the associativity may vary, and that the associativity could be one (N=1). The virtual page numbers are designated VA0 and VA1, and the corresponding real page numbers are designated RA0 and RA1. Table maintenance data (TM) may include, e.g., a most recently used bit or bits for determining which entry is to be deleted from the TLB when a new entry must be brought in from the main page table; valid bits; etc.

In operation, a virtual address to be translated is input to select logic 402, which uses a hash function such as a subset of the address bits to select a single line of table 401, this operation typically requiring a single CPU clock cycle. VA0 from the selected line is input to comparator 404, while VA1 from the selected line is simultaneously input to comparator 405. If either virtual page number VA0 or VA1 is identical to the virtual address to be translated, the output line of the corresponding comparator is activated, causing selector 406 to select the corresponding real page number for output. If neither VA0 nor VA1 is identical to the virtual address to be translated, additional NOR gate 407 generates an appropriate signal to indicate a TLB miss, and cause CPU to take appropriate action to translate the address from elsewhere (e.g., the main page table). The operations performed by comparators 404, 405 and selector 406 typically require one additional CPU clock cycle, making a total of two CPU clock cycles to translate a virtual address to a real address (assuming the address is contained in the TLB), or to determine that the address is not in the TLB.

As described above, CPU 101 preferably contains multiple pipelines 212–214, at least one of which involves operations requiring access to memory locations. Loads and stores are typical memory operations, but there could be other such memory operations. As one example of another such memory operation, although by no means the only such possible example, some systems support direct copying of data in one memory location to another. As further explained above, memory locations are addressed with real, rather than virtual, addresses.

Where multiple pipeline operations access memory locations, there exists the possibility that two or more pending operations will access the same memory location in a manner that could cause errors. Such an occurrence is referred to as a pipeline address conflict. A simple example of such a pipeline address conflict, although not necessarily the only such example, is a load following a store to the same memory address. If the store has not yet completed before the load begins, there is some possibility that the load operation will load old (and therefore erroneous) data. It will be observed that not all memory access operations which access the same memory locations will conflict. For example, if two load instructions access the same memory location, these instructions do not conflict with each other. Therefore, in determining whether an actual conflict exists, the system may also have logic which compares operation types or other data.

Figure 5:
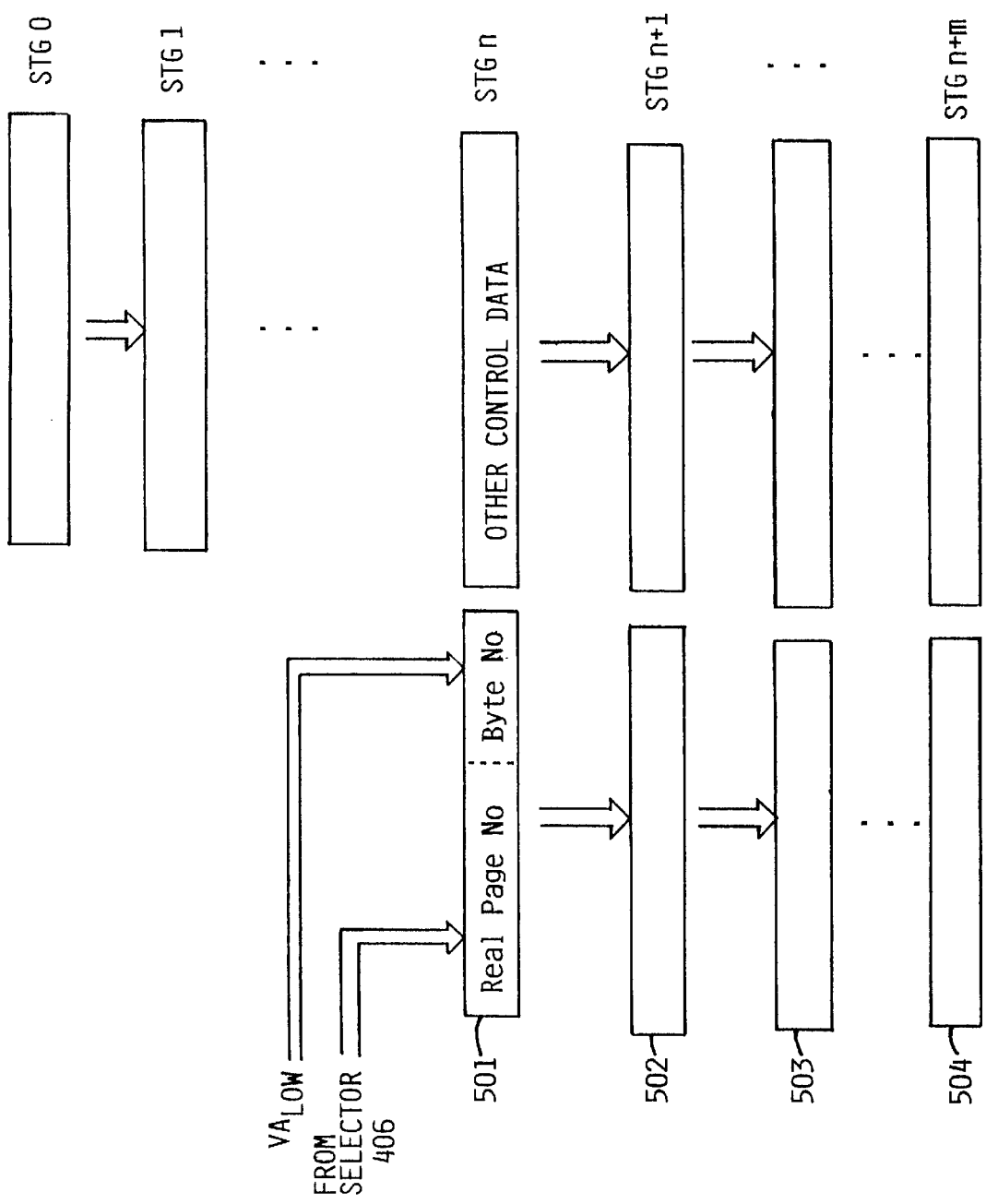
FIG. 5 is a high-level diagram of a set of pipeline control registers for various pipeline stages, according to the preferred embodiment.

In order to detect a pipeline address conflict, and for other control purposes, the real addresses of pending memory access operations in the pipeline are stored in pipeline control registers, and shifted into succeeding pipeline stages with each CPU clock cycle. FIG. 5 is a high-level diagram of a set of pipeline control registers for various pipeline stages. In addition to real addresses, various other control data may be stored in the pipeline control registers, such as a type of operation being performed, a destination or source register for data, etc. Some of this information may not be available immediately, and may be added as it is generated. Because it takes several cycles to decode an instruction, generate a virtual address and translate it to a real address, no real address is available for some early pipeline stages. As shown in FIG. 5, real addresses are held in registers 501–504 corresponding to pipeline stages n and greater, i.e., stages after the real address has been generated. The real address is derived by concatenating the real page number output from selector 406 with the byte number (low-order L bits) from the virtual address.

In a conventional CPU, a real address of a memory access instruction is compared with the real addresses of potentially conflicting memory address instructions ahead of it in the pipeline, but this operation is not be performed until the real address is generated, i.e., stage n or greater. Once a real address of an instruction I is output by selector 406 of TLB 216, it can then be compared to the real addresses any potentially conflicting memory address instructions ahead of instruction I in the pipeline. The real addresses of memory address instructions ahead of instruction I will have been decoded in previous CPU cycles, and are therefore already available and in the pipeline control registers.

Figure 6:
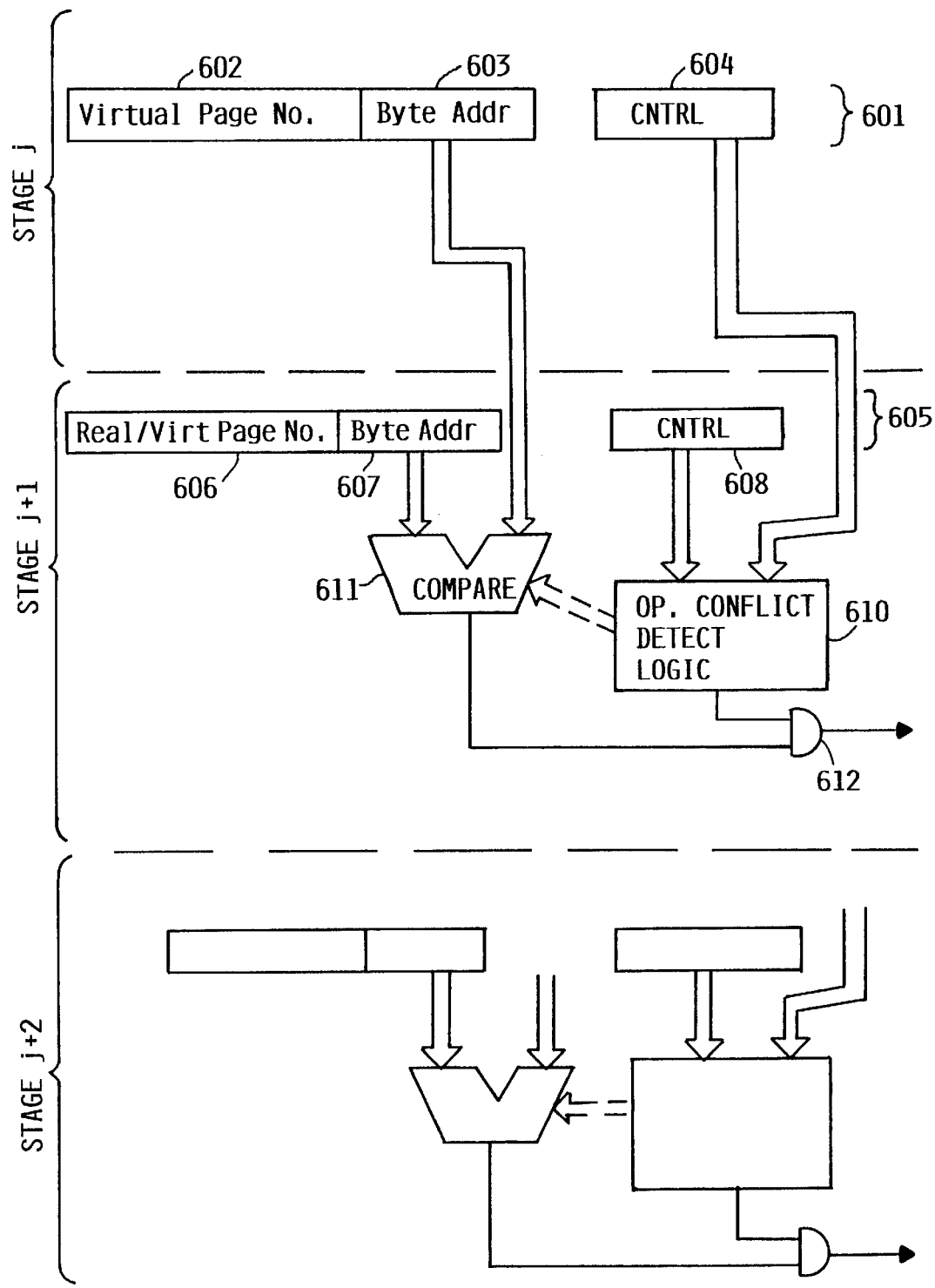
FIG. 6 is a diagram of detection logic for early detection of pipeline address conflicts at multiple pipeline stages, according to the preferred embodiment.
Figure 7:
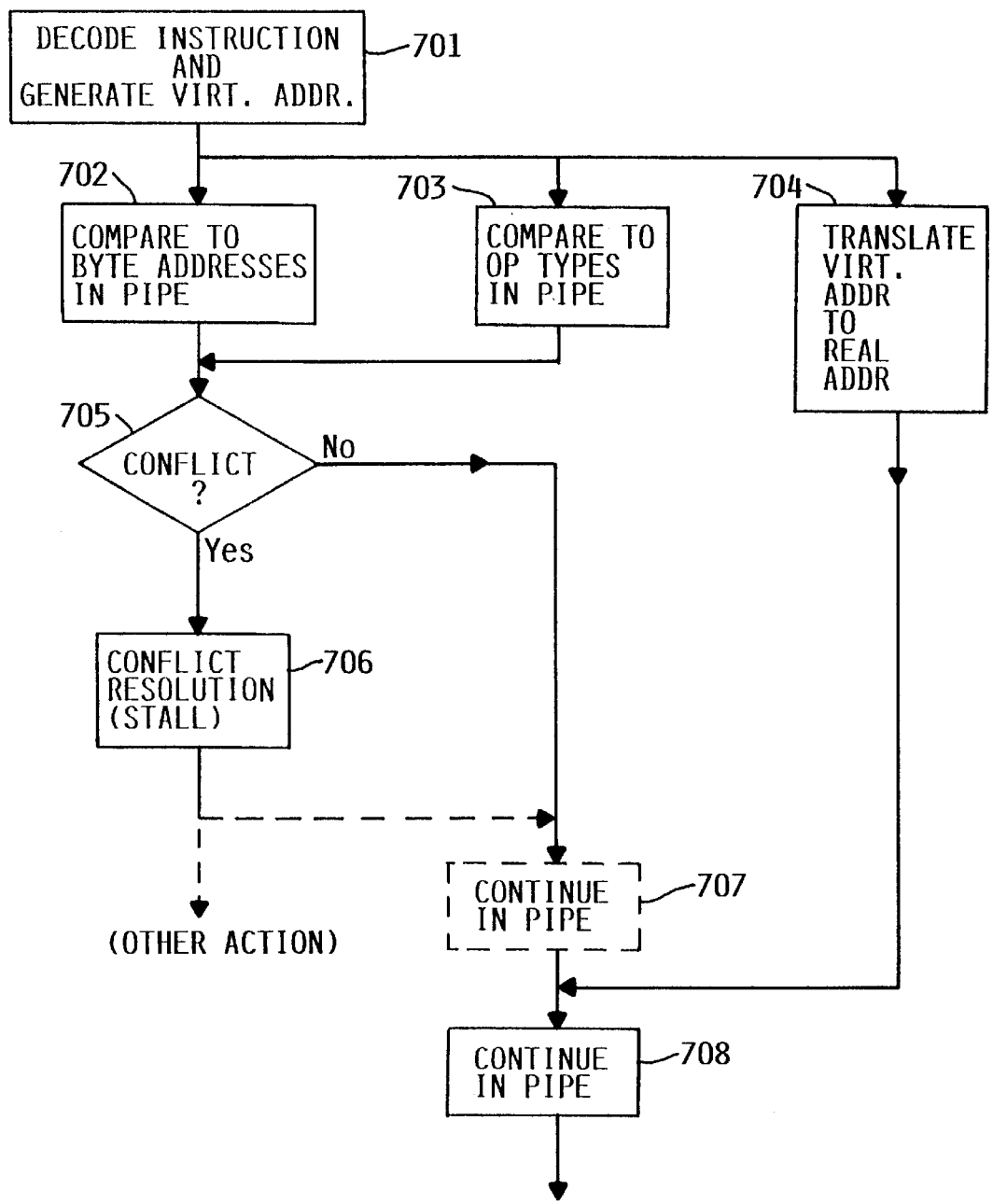
FIG. 7 is a flow diagram illustrating in a generalized manner the pipelined execution of an instruction, according to the preferred embodiment.

In accordance with the preferred embodiment, the low-order L bits of the virtual address (which are the same as the low-order L bits of the real address) of an instruction I are compared to the low-order L bits of the real address of each potentially conflicting memory address instruction ahead of instruction I in the pipeline to determine the existence of a possible pipeline address conflict FIG. 6 is a diagram of detection logic which uses the low-order L bits of addresses for early detection of pipeline address conflicts at multiple pipeline stages, according to the preferred embodiment. The flow of operations using this detection logic and other elements of CPU 101 is shown in FIG. 7. At some relatively early pipeline stage designated stage j (i.e., a stage earlier than stage n of FIG. 5, and which could be the first stage in the pipeline), the instruction is decoded, a virtual address it references is generated and available in pipeline register 601 (represented as step 701 in FIG. 7). This instruction (at stage j) will be herein designated instruction $I_J$ for clarity. Register 601 contains an address portion having a virtual page number portion 602 and an L-bit byte address portion 603 referenced by instruction $I_J$. Additionally, at least some control information relative to instruction $I_J$ is available in control information portion 604 of pipeline register 601, although this control information could be incomplete at this early stage. Control information portion 604 preferably includes at least enough information concerning the type of operation specified by instruction $I_J$ to permit a determination whether a pipeline address conflict could exist with other operations at the same address in the pipeline. This control information could include, e.g., an op code for the operation to be performed by instruction $I_J$, or could be information derived from the op code such as a single bit or set of bits which are used to indicate conflicts. For example, in a simple implementation, control information 604 could include a single bit to indicate whether instruction $I_J$ is a load-type instruction, this single bit being either one of the bits of the op code, or being derived from the op code using some logic function. Additionally, the bit or bits of control information used to determine address conflicts might be derived from some combination of the op code and other information. For example, if some form of memory partitioning is used for different threads in a multi-threaded processor, a thread identifier may be significant.

A pipeline register 605 for stage j+1 contains an address portion having a page number portion 606 and an L-bit byte address portion 607, and a control information portion 608, for an instruction at stage j+1, herein designated instruction $I_{J+1}$. Since stage j+1 is later in the pipeline than stage j, the virtual address referenced by instruction $I_{J+1}$ might already be decoded to a real address using TLB 216 by the time instruction $I_{J+1}$ reaches stage j+1. Accordingly, page number portion 606 might contain the real page number referenced by instruction $I_{J+1}$ and derived from the virtual page number; however, it might be that more than one cycle is required to derive the real page number, and that page number portion 606 at stage j+1 contains a virtual page number. In either case, the byte address contained in portion 607 is the same. Control information portion 608 includes at least some information concerning the type of operation specified by instruction $I_{J+1}$ to permit a determination whether a pipeline address conflict could exist with other operations in the pipeline, and in this specific example, with instruction $I_J$. This information may be an op code for instruction $I_{J+1}$, or may be information derived from the op code or an op code in combination with other information; it could amount a single bit.

One or more bits from control information portion 604 for stage j and one or more bits from control information portion 608 for stage j+1 are input to conflict detection logic 610. Conflict detection logic 610 analyzes the bit patterns to determine whether the specified operations conflict. I.e., logic 610 determines whether, assuming that instructions $I_J$ and $I_{J+1}$ reference the same or overlapping addresses, the nature of the specified operations would conflict and potentially corrupt data. The output of logic 610 is a single logic line in which one level (a logic '1' in the illustrated embodiment) indicates a conflict, while the other level indicates no conflict. The operation of conflict detection logic 610 is illustrated in FIG. 7 as step 703.

The complexity of conflict detection logic 610 may vary with the processor design. In a simple embodiment in which a single bit in control information 604 indicates a load-type instruction, and a single bit in control information 608 indicates a store-type instruction, logic 604 may be nothing more than an AND gate. However, conflict detection logic will typically be more complex. For example, a potential conflict may also exist where a load-type operation is followed by a store-type operation; some systems may support operations which are both read and write in nature, such as a copy operation.

Comparator 611 compares the byte address of instruction $I_J$ from register portion 603 with the byte address of instruction $I_{J-1}$ from register portion 607. If the byte addresses are the same, comparator 611 outputs an appropriate logic signal (a logic '1' in the illustrated embodiment); if any bit of the addresses does not compare, a logic '0' is output. The operation of comparator 611 is illustrated in FIG. 7 as step 702.

AND gate 612 combines the outputs of conflict detection logic 610 and comparator 611 to provide a pipeline address conflict signal. I.e., a pipeline address conflict signal will be generated whenever both the byte addresses of the two instructions are the same, and the operations are of a conflicting type. The conflict signal is illustrated in FIG. 7 as the "Y" branch from step 705.

Another level of complexity in conflict detection logic 610 and comparator 611 may be a range of addresses to be compared. Typically, loads and stores operate on multiple bytes of data in a single instruction and reference addresses on a multi-byte boundary, the number of bytes corresponding to some architectural characteristic, such as the width of the memory bus. For example, in the typical system, most loads and stores may operate on four bytes of data, and therefore address data on a 4-byte boundary, the two lowest order address bits being 0. However, some operations may operate on a different number of bytes. Logic 610 may therefore optionally determine the number of address bits to be compared by comparator 611. The number of address bits to be compared should correspond to the operation having the largest address range. E.g., where a 4-byte operation has a potential conflict with a 1-byte operation, the two lowest order address bits should not be compared, because a conflict would exist even if the two lowest order address bits of the 1-byte operation are non-zero. The dashed arrow in FIG. 6 running between logic 610 and comparator 611 indicates one or more control lines which may control the number of address bits to be compared.

Pipeline stage register 605, conflict detect logic 610, comparator 611, and AND gate 612 may be repeated for one or more stages following stage j+1 in the pipeline. FIG. 6 illustrates repetition for stage j+2, it being understood that this logic may be repeated for more than the two stages shown in FIG. 6. Each such stage compares its byte address and control information with that of instruction $I_J$. Thus, as of the pipeline stage in which the virtual address of a new instruction is first available, i.e., stage j of FIG. 6, the byte address referenced by the instruction is compared with the byte addresses of the instructions at later stages of the pipeline. The number of pipeline stages containing detection logic may depend on various system architectural details. It is possible to compare instruction $I_J$ with all instructions at later pipeline stages, i.e., to replicate conflict detection hardware for each stage after stage j. However, for most processor designs, this will not be necessary. Typically, it will only be necessary to ensure a minimum gap between instruction $I_J$ and any conflicting instruction, this gap being less than the number of subsequent stages in the pipeline. For example, if a time interval of k cycles is sufficient to ensure that two instructions do not conflict, it is only necessary to compare instructions from stage j+1 to stage j+k−1, and the comparison hardware at stages j+k and greater is unnecessary. For a typical processor design, k may be 3, and could be as low as 2 (in which case conflict detection hardware exists only at stage j+1).

It will be observed that comparing the low-order L bits (which are the same for virtual or real addresses) of instruction $I_J$ with the corresponding bits of every potentially conflicting instruction at a later stage in the pipeline will detect any pipeline address conflict. However, since fewer than all address bits are compared, it is possible that this technique will yield a "false positive", i.e., that all L bits will match those of some address in the pipeline, yet no address conflict in fact exists because the higher order real address bits are not the same.

Generally, it may be assumed that the low-order L bits of address will have a more or less random distribution, and therefore the frequency of "false positives" is related to L and to the size of an individual memory bus operation. For example, for L=12 bits, and assuming all memory reference operations are a size of 4 bytes (i.e., all relevant operations occur on a 4-byte boundary), the odds of a random address match of any two addresses are $1:(2^{12} \div 4) \approx 0.1\%$. This rate will accordingly vary with different values of L or operation size. The performance impact of such a rate of false positives depends in turn on the average number of conflicting operations in the pipeline and the consequence of a false positive. For a typical pipeline, there may be approximately 6–8 stages in the pipeline below instruction $I_J$, but as described herein, an address comparison may be made for fewer than all of these stages, the pipeline will not always be full, and not all of the instructions will be conflicting instructions (e.g., the instructions may be two loads, which do not conflict). It is believed that, on the average, there will be less than 1 potentially conflicting instruction below each new load instruction $I_J$ in the pipeline, and therefore less than 0.1% of the time that a load instruction occurs, the address comparison made herein will yield a false positive. For most processor designs, it is believed that the occurrence of an actual address conflict will occur with greater frequency.

The action to be taken by the CPU upon detection of a pipeline address conflict by comparing low-order bits (referred to generally as conflict resolution action, and illustrated if FIG. 7 as step 706) may vary with the processor design. According to the processor design of the preferred embodiment, selective stages of the pipeline are stalled a pre-determined number of cycles in order to introduce a sufficient gap between instruction $I_J$ and the potentially conflicting instruction, this pre-determined number depending on the stage of the potentially conflicting instruction. I.e., if a gap of k cycles is required between instruction $I_J$ and a conflicting instruction, and a potentially conflicting instruction is detected at pipeline stage j+i, then the instructions at pipeline stages j and earlier are stalled (k−i) cycles, while the instructions at stages j+1 and later continue to advance in the pipeline during the next (k−i) cycles. After (k−i) cycles, a gap of k cycles will exist between instruction $I_J$ and the potentially conflicting instruction. At this point, all instruction are allowed to advance in the pipeline.

It should be emphasized that the action described above is taken whether an actual address conflict exists, or whether a "false positive" has been detected. Specifically, even where no actual address conflict exists because the real page number portions of the two addresses are not identical, the detection of a match in the byte addresses is treated in every respect as if an actual address conflict had occurred, and no further effort is made to determine whether in fact a conflict exists. However, the performance cost of the action is only (k−i) cycles. For most processor designs, k will be rather low (e.g., 3), and since i is always at least 1, the average number of cycles lost upon detection of a potential address conflict, whether actual or not, is perhaps 1 or 2 cycles.

The chief benefit of comparing byte addresses (before translating the virtual address of instruction $I_J$ to its real address) is that it permits an earlier determination of an address conflict. Where the address conflict is detected earlier, it is generally possible to simply stall the portion of the pipeline at stage j (and earlier stages if they exist) for a small number of cycles, while allowing other stages to continue. The cost, as explained above, is generally 1 or 2 cycles. If, on the other hand, an address conflict is detected at a later stage, it may be necessary to reload values into the pipeline and restart it; the performance cost of such an operation will typically be on the order of the pipeline length, e.g., 6 to 8 cycles. Thus, even though some percentage of the detected address conflicts using the present invention will in fact be false positives, the lower performance cost of stalling the pipeline as a result of early detection can be expected to more than make up for the effect of the false positives.

Several variations of address conflict resolution action are possible. It is alternatively possible to stall the instructions at stages j and earlier for an architecturally determined fixed number of cycles in all cases, this number being the minimum number guaranteed to always produce a sufficient gap, i.e. (k−1). It would alternatively be possible to stall the instructions at stages j and earlier until the conflicting operation has completed or the conflicting operation has reached some progress milestone other than completion, after which address conflict is not an issue. For some processor designs, this number of cycles could be variable, and could be determined by a logic signal when the event occurs. Alternatively, it would be possible to simply stall the instructions at stages j and earlier for a single cycle, and to then repeat the address comparison; the process of stalling a single cycle and repeating the address comparison would repeat until a conflict is no longer detected.

Preferably, many actions take place simultaneously or concurrently in CPU 101, and in particular, once a virtual address for an instruction has been generated, the available address translation mechanisms (i.e., translation lookaside buffer 216 or any other mechanism) are invoked to translate the virtual address to a real address (step 704). Translation of the virtual address to real address preferably takes place concurrently with the comparisons of byte addresses in the pipeline and operation types. This process is illustrated in FIG. 7 as the concurrent branch to steps 702, 703 and 704. Because the logic which detects conflict is relatively simple, it is expected that the existence of a pipeline address conflict will be determined before completion of the translation of virtual address to real address. Where no conflict is detected, the operations proceed normally in the pipeline, without any delay associated with checking for address conflict. This is represented in FIG. 7 as steps 707 and 708, showing that some additional steps may be performed by the pipeline before completion of the translation (step 707), while others are performed after completion of the translation (step 708).

As described herein, it has been assumed for clarity of illustration that a single pipeline exists having a single instruction at each stage. However, it will be understood that multiple pipelines may exist performing operations in parallel, or a single complex pipeline may contain multiple instructions in parallel at each stage, or other variations of the pipeline construct may exist. A single, simple pipeline, a collection of individual pipelines, or a complex pipeline having multiple operations at each stage are all variations of the same basic design feature and are generically referred to herein as pipeline mechanisms, and that where appropriate, the informal designation "pipeline" includes all such forms of pipeline mechanism. Where multiple pipelines exist or multiple operations exist at a single pipeline stage, it may be necessary, depending on the architecture, to compare the byte address referenced by an instruction $I_J$ with byte addresses from multiple other instructions in the same or different pipelines at each stage, including stage j.

While the invention has been described in connection with what is currently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A computer system, comprising:
 a memory addressable using real addresses, each said real address having M+L bits, including an M-bit high-order address portion and an L-bit low order address portion;
 address generation logic which generates virtual addresses for computer processing operations, each said virtual address having K+L bits, including a K-bit high-order address portion and an L-bit low-order address portion;

an address translation mechanism which translates virtual addresses to real addresses, said address translation mechanism translating a source virtual address to a target real address by translating the K-bit high-order portion of said source virtual address to the M-bit high-order portion of said target real address and concatenating said M-bit high-order portion of said target real address with the L-bit low-order portion of said source virtual address, the L-bit low-order portion of said target real address being identical to the L-bit low order portion of said source virtual address;

a pipeline mechanism; and a pipeline address conflict mechanism which detects an address conflict between a first operation in said pipeline mechanism and a second operation in said pipeline mechanism, said pine line address conflict mechanism comparing at least part of the L-bit low-order portion of a virtual address of said first operation in said pipeline mechanism with a corresponding part of the L-bit low-order portion of an address of a second operation in said pipeline mechanism, and taking an address conflict resolution action if the at least part of the L-bit low-order portion of a virtual address of said first operation in said pipeline mechanism is identical to the corresponding part of the L-bit low-order portion of the address of said second operation in said pipeline mechanism;

wherein said address conflict resolution action comprises stalling a portion of the pipeline mechanism including said first operation for a pre-determined number of cycles.

2. The computer system of claim 1, wherein said pipeline address conflict mechanism compares all of the L-bit low-order portion of said virtual address of said first operation in said pipeline mechanism with all of the L-bit low-order portion of said address of said second operation in said pipeline mechanism, and taking an address conflict resolution action if all of the L-bit low-order portion of said virtual address of said first operation in said pipeline mechanism is identical to all of the L-bit low-order portion of the address of said second operation in said pipeline mechanism.

3. The computer system of claim 1, wherein said pre-determined number of cycles is determined according to the formula (k-i), where k is a minimum required cycle gap between said first operation and said second operation, and i is an existing cycle gap between said first operation and said second operation.

4. The computer system of claim 1, further comprising at least one cache, said at least one cache being addressable using said real addresses.

5. The computer system of claim 1, wherein said pipeline address conflict mechanism further includes operation conflict logic which compares data concerning a type of operation performed by said first operation with data concerning a type of operation performed by said second operation to determine whether said first operation and said second operation conflict.

6. The computer system of claim 1, wherein said address translation mechanism comprises a translation lookaside buffer, said translation lookaside buffer storing a plurality of address portion pairs, each address portion pair including a portion of a virtual address and a corresponding portion of a real address.

7. A computer system, comprising:

a memory addressable using real addresses, each said real address having M+L bits, including an M-bit high-order address portion and an L-bit low order address portion;

address generation logic which generates virtual addresses for computer processing operations, each said virtual address having K+L bits, including a K-bit high-order address portion and an L-bit low-order address portion;

an address translation mechanism which translates virtual addresses to real addresses, said address translation mechanism translating a source virtual address to a target real address by translating the K-bit high-order portion of said source virtual address to the M-bit high-order portion of said target real address and concatenating said M-bit high-order portion of said target real address with the L-bit low-order portion of said source virtual address, the L-bit low-order portion of said target real address being identical to the L-bit low order portion of said source virtual address;

a pipeline mechanism; and a pipeline address conflict mechanism which detects an address conflict between a first operation in said pipeline mechanism and a second operation in said pipeline mechanism, said pipeline address conflict mechanism comparing at least part of the L-bit low-order portion of a virtual address of said first operation in said pipeline mechanism with a corresponding part of the L-bit low-order portion of an address of a second operation in said pipeline mechanism, and taking an address conflict resolution action if the at least part of the L-bit low-order portion of a virtual address of said first operation in said pipeline mechanism is identical to the corresponding part of the L-bit low-order portion of the address of said second operation in said pipeline mechanism;

wherein said address translation mechanism comprises a translation lookaside buffer, said translation lookaside buffer storing a plurality of address portion pairs, each address portion pair including a portion of a virtual address and a corresponding portion of a real address;

wherein said translation lookaside buffer is N-way associative, where N>1.

8. The computer system of claim 7, wherein said address conflict resolution action comprises stalling a portion of the pipeline mechanism including said first operation until said second operation reaches a pre-determined progress milestone.

9. The computer system of claim 7, wherein said pipeline address conflict mechanism comprises a plurality of sets address conflict detection logic, each set detecting an address conflict between said first operation in said pipeline mechanism and a respective operation in said pipeline mechanism other than said first operation, each said set comparing said at least part of the L-bit low-order portion of said virtual address of said first operation in said pipeline mechanism with a corresponding part of the L-bit low-order portion of an address of the respective operation in said pipeline mechanism other than said first operation, and causing an address conflict resolution action if the at least part of the L-bit low-order portion of a virtual address of said first operation in said pipeline mechanism is identical to the corresponding part of the L-bit low-order portion of the address of the respective operation in said pipeline mechanism other than said first operation.

10. The computer system of claim 7, wherein said pipeline address conflict mechanism compares all of the L-bit low-order portion of said virtual address of said first operation in said pipeline mechanism with all of the L-bit low-order portion of said address of said second operation in said pipeline mechanism, and taking an address conflict resolution action if all of the L-bit low-order portion of said virtual address of said first operation in said pipeline mechanism is identical to all of the L-bit low-order portion of the address of said second operation in said pipeline mechanism.

11. The computer system of claim 7, wherein said address conflict resolution action comprises stalling a portion of the pipeline mechanism including said first operation for a pre-determined number of cycles.

12. The computer system of claim 7, wherein said pipeline address conflict mechanism further includes operation conflict logic which compares data concerning a type of operation performed by said first operation with data concerning a type of operation performed by said second operation to determine whether said first operation and said second operation conflict.

13. A processing unit for a computer system, said processing unit for use in a computer system having a memory addressable using real addresses, each said real address having M+L bits, including an M-bit high-order address portion and an L-bit low order address portion, and at least one address translation mechanism for translating virtual addresses having K+L bits to real addresses, said address translation mechanism translating a source virtual address to a target real address by translating the K-bit high-order portion of said source virtual address to the M-bit high-order portion of said target real address and concatenating said M-bit high-order portion of said target real address with the L-bit low-order portion of said source virtual address, the L-bit low-order portion of said target real address being identical to the L-bit low order portion of said source virtual address, said processing unit comprising:

address generation logic which generates virtual addresses for computer processing operations, each said virtual address having K+L bits, including a K-bit high-order address portion and an L-bit low-order address portion;

a pipeline mechanism; and a pipeline address conflict mechanism which detects an address conflict between a first operation in said pipeline mechanism and a second operation in said pipeline mechanism, said pipeline address conflict mechanism comparing at least part of the L-bit low-order portion of a virtual address of said first operation in said pipeline mechanism with a corresponding part of the L-bit low-order portion of an address of a second operation in said pipeline mechanism, and taking an address conflict resolution action if the at least part of the L-bit low-order portion of a virtual address of said first operation in said pipeline mechanism is identical to the corresponding part of the L-bit low-order portion of the address of said second operation in said pipeline mechanism;

wherein said address conflict resolution action comprises stalling a portion of the pipeline mechanism including said first operation for a pre-determined number of cycles.

14. The processing unit for a computer system of claim 13, wherein said pipeline address conflict mechanism compares all of the L-bit low-order portion of said virtual address of said first operation in said pipeline mechanism with all of the L-bit low-order portion of said address of said second operation in said pipeline mechanism, and taking an address conflict resolution action if all of the L-bit low-order portion of said virtual address of said first operation in said pipeline mechanism is identical to all of the L-bit low-order portion of the address of said second operation in said pipeline mechanism.

15. The processing unit for a computer system of claim 13, wherein said pre-determined number of cycles is determined according to the formula (k-i), where k is a minimum required cycle gap between said first operation and said second operation, and i is an existing cycle gap between said first operation and said second operation.

16. The processing unit for a computer system of claim 13, wherein said pipeline address conflict mechanism further includes operation conflict logic which compares data concerning a type of operation performed by said first operation with data concerning a type of operation performed by said second operation to determine whether said first operation and said second operation conflict.

17. The processing unit for a computer system of claim 13, wherein said address translation mechanism comprises a translation lookaside buffer, said translation lookaside buffer storing a plurality of address portion pairs, each address portion pair including a portion of a virtual address and a corresponding portion of a real address.

18. A processing unit for a computer system said processing unit for use in a computer system having a memory addressable using real addresses, each said real address having M+L bits, including an M-bit high-order address portion and an L-bit low order address portion, and at least one address translation mechanism for translating virtual addresses having K+L bits to real addresses, said address translation mechanism translating a source virtual address to a target real address by translating the K-bit high-order portion of said source virtual address to the M-bit high-order portion of said target real address and concatenating said M-bit high-order portion of said target real address with the L-bit low-order portion of said source virtual address, the L-bit low-order portion of said target real address being identical to the L-bit low order portion of said source virtual address, said processing unit comprising:

address generation logic which generates virtual addresses for computer processing operations, each said virtual address having K+L bits, including a K-bit high-order address portion and an L-bit low-order address portion;

a pipeline mechanism; and a pipeline address conflict mechanism which detects an address conflict between a first operation in said pipeline mechanism and a second operation in said pipeline mechanism, said pipeline address conflict mechanism comparing at least part of the L-bit low-order portion of a virtual address of said first operation in said pipeline mechanism with a corresponding part of the L-bit low-order portion of an address of a second operation in said pipeline mechanism, and taking an address conflict resolution action if the at least part of the L-bit low-order portion of a virtual address of said first operation in said pipeline mechanism is identical to the corresponding part of the L-bit low-order portion of the address of said second operation in said pipeline mechanism;

wherein said address translation mechanism comprises a translation lookaside buffer, said translation lookaside buffer storing a plurality of address portion pairs, each address portion pair including a portion of a virtual address and a corresponding portion of a real address;

wherein said translation lookaside buffer is N-way associative, where N>1.

19. The processing unit for a computer system of claim 18, wherein said address conflict resolution action comprises stalling a portion of the pipeline mechanism including said first operation until said second operation reaches a pre-determined progress milestone.

20. The processing unit for a computer system of claim 18, further comprising at least one cache, said at least one cache being addressable using said real addresses.

21. The processing unit for a computer system of claim 18, wherein said pipeline address conflict mechanism comprises a plurality of sets address conflict detection logic, each set detecting an address conflict between said first operation in said pipeline mechanism and a respective operation in said pipeline mechanism other than said first operation, each said set comparing said at least part of the L-bit low-order portion of said virtual address of said first operation in said pipeline mechanism with a corresponding part of the L-bit low-order portion of an address of the respective operation in said pipeline mechanism other than said first operation, and causing an address conflict resolution action if the at least part of the L-bit low-order portion of a virtual address of said first operation in said pipeline mechanism is identical to the corresponding part of the L-bit low-order portion of the address of the respective operation in said pipeline mechanism other than said first operation.

22. The processing unit for a computer system of claim 18, wherein said processing unit is embodied in a single integrated circuit chip.

23. The processing unit for a computer system of claim 18, wherein said pipeline address conflict mechanism compares all of the L-bit low-order portion of said virtual address of said first operation in said pipeline mechanism with all of the L-bit low-order portion of said address of said second operation in said pipeline mechanism, and taking an address conflict resolution action if all of the L-bit low-order portion of said virtual address of said first operation in said pipeline mechanism is identical to all of the L-bit low-order portion of the address of said second operation in said pipeline mechanism.

24. The processing unit for a computer system of claim 18, wherein said address conflict resolution action comprises stalling a portion of the pipeline mechanism including said first operation for a pre-determined number of cycles.

25. The processing unit for a computer system of claim 18, wherein said pipeline conflict mechanism further includes operation conflict logic which compares data concerning a type of operation performed by said first operation with data concerning a type of operation performed by said second operation to determine whether said first operation and said second operation conflict.

* * * * *